United States Patent
Shafer et al.

(10) Patent No.: US 8,450,888 B2
(45) Date of Patent: May 28, 2013

(54) INTEGRATED BRUSHLESS STARTER/GENERATOR SYSTEM

(75) Inventors: Douglas George Shafer, Cincinnati, OH (US); Peter David Toot, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 12/426,445

(22) Filed: Apr. 20, 2009

(65) Prior Publication Data
US 2010/0264759 A1    Oct. 21, 2010

(51) Int. Cl.
*H02K 9/00*    (2006.01)
*H02K 9/20*    (2006.01)

(52) U.S. Cl.
USPC ............. 310/54; 310/60 A; 310/61; 310/75 D (58) Field of Classification Search
CPC ................ H02K 9/19; H02K 5/20; H02K 3/22
USPC .......................................... 310/54, 60 A, 75 D
IPC ................................................ H02K 9/00, 9/20
See application file for complete search history.

(56) References Cited

U.S. PATENT DOCUMENTS

| | | | | |
|---|---|---|---|---|
| 3,060,335 | A | * | 10/1962 | Greenwald ....................... 310/54 |
| 3,260,872 | A | * | 7/1966 | Potter ............................. 310/54 |
| 3,531,668 | A | | 9/1970 | Cathey |
| 3,648,085 | A | * | 3/1972 | Fujii ............................... 310/54 |
| 4,647,805 | A | * | 3/1987 | Flygare et al. .................. 310/61 |
| 4,841,216 | A | | 6/1989 | Okada et al. |
| 5,034,638 | A | * | 7/1991 | McCabria ....................... 310/54 |
| 5,512,811 | A | | 4/1996 | Latos et al. |
| 5,589,720 | A | * | 12/1996 | Berger ............................ 310/61 |
| 5,627,420 | A | * | 5/1997 | Rinker et al. ................... 310/87 |
| 5,698,912 | A | | 12/1997 | Rasch et al. |
| 6,191,511 | B1 | * | 2/2001 | Zysset .......................... 310/60 A |

(Continued)

FOREIGN PATENT DOCUMENTS

| | | |
|---|---|---|
| EP | 0688090 A1 | 12/1995 |
| EP | 0990820 A2 | 4/2000 |
| WO | 2008133786 A1 | 11/2008 |

OTHER PUBLICATIONS

PCT Search Report and Written Opinion dated Dec. 27, 2011 from corresponding Application No. PCT/US2010/027170.

*Primary Examiner* — John K Kim
(74) *Attorney, Agent, or Firm* — General Electric company; William Scott Andes; Sushupta T. Sudarshan (57) ABSTRACT

A brushless starter/generator includes a rotor rotatably mounted within a stator mounted within a housing and an oil cooling system using cooling oil from an engine accessory gearbox for cooling the rotor and the stator. The rotor is fixedly mounted on a rotor shaft having a rotor heat exchanger disposed therein. A stator heat exchanger for cooling the stator includes an oil jacket around the housing. The stator heat exchanger includes a grooved tube around the housing and axially extending axial passages connected to annular inlet and outlet manifolds in the grooved tube. The rotor shaft is operably connected to a power take-off shaft within the gearbox and rotatably supported by a shaft bearing in a gearbox casing of the accessory gearbox. The oil cooling system is a dry cavity oil cooling system which prevents cooling oil from entering an air gap between the rotor and the stator.

20 Claims, 6 Drawing Sheets

U.S. PATENT DOCUMENTS

| | | | |
|---|---|---|---|
| 6,329,731 B1 | 12/2001 | Arbanas et al. | |
| 6,351,045 B1 * | 2/2002 | Shoykhet | 310/52 |
| 6,462,429 B1 | 10/2002 | Dhyanchand et al. | |
| 6,750,572 B2 * | 6/2004 | Tornquist et al. | 310/54 |
| 6,844,707 B1 | 1/2005 | Raad | |
| 7,009,317 B2 * | 3/2006 | Cronin et al. | 310/54 |
| 7,208,854 B1 * | 4/2007 | Saban et al. | 310/61 |
| 7,301,311 B2 | 11/2007 | Xu et al. | |
| 7,948,125 B2 * | 5/2011 | Woody et al. | 310/54 |
| 2004/0070291 A1 * | 4/2004 | Chan et al. | 310/64 |
| 2005/0274489 A1 * | 12/2005 | Brand | 165/80.2 |
| 2006/0017335 A1 * | 1/2006 | Matin et al. | 310/57 |
| 2006/0026967 A1 * | 2/2006 | Bruno et al. | 60/802 |
| 2006/0082228 A1 * | 4/2006 | Urbahn et al. | 310/52 |
| 2006/0087123 A1 | 4/2006 | Stout et al. | |
| 2006/0101804 A1 * | 5/2006 | Stretton | 60/226.1 |
| 2006/0248865 A1 * | 11/2006 | Latulipe et al. | 55/400 |
| 2007/0018516 A1 * | 1/2007 | Pal et al. | 310/61 |
| 2007/0120427 A1 * | 5/2007 | Iund et al. | 310/54 |
| 2007/0194639 A1 * | 8/2007 | Birdi et al. | 310/54 |
| 2007/0210655 A1 * | 9/2007 | Bahr et al. | 310/54 |
| 2007/0265133 A1 * | 11/2007 | Smook | 475/317 |
| 2008/0093850 A1 | 4/2008 | Taneja et al. | |
| 2009/0064683 A1 | 3/2009 | Moniz et al. | |
| 2009/0309461 A1 * | 12/2009 | Berenger et al. | 310/67 R |
| 2010/0164428 A1 * | 7/2010 | Xu et al. | 318/767 |
| 2010/0264759 A1 * | 10/2010 | Shafer et al. | 310/54 |
| 2012/0091834 A1 * | 4/2012 | Bradfield | 310/54 |

* cited by examiner

INTEGRATED BRUSHLESS STARTER/GENERATOR SYSTEM

BACKGROUND OF THE INVENTION

1. Field of the Invention

The present invention relates to aircraft gas turbine engine starters and generators.

2. Description of Related Art

Aircraft gas turbine engines typically include a fan section followed by a core engine having, in serial flow arrangement, a compressor which compresses airflow entering the engine, a combustor which burns a mixture of fuel and air, and a high-pressure turbine section followed by a low pressure turbine section which extracts energy from airflow discharged from the core engine to power the fan section which generates thrust.

Aircraft and aircraft engine accessories are mechanically driven by the engine through a power take-off shaft connected to an engine accessory gearbox. Among the accessories mounted to the gearbox is a starter motor for starting the gas turbine engine and a generator to generate electrical power for the aircraft. It is known to provide a single starter/generator to provide both starting and electrical power generation. Starter/generators with and without brushes, referred to as brushed and brushless, are well known for electrical generation and starting in aircraft gas turbine engines. It is known to use air and/or oil coolers for cooling the starter/generators. The electrical generation in such units is limited in amperage and often require complicated cooling apparatus including cooling fans and ducts which leads to power and fuel robbing parasitic flows required for air cooled starter/generators using brushes.

It is highly desirable to reduce the weight of aircraft gas turbine engine starter/generators while increasing the amount of amperage output. It is highly desirable to reduce the amount and complexity of cooling apparatus for the starter/generators. It is highly desirable to reduce power and fuel robbing parasitic flows required for air cooled starter/generators using brushes.

SUMMARY OF THE INVENTION

An aircraft gas turbine engine brushless starter/generator includes a rotor rotatably mounted within a stator which is mounted within a housing and an oil cooling system for using cooling oil from an engine accessory gearbox for cooling the rotor and the stator. The rotor is fixedly mounted on a rotor shaft and the oil cooling system includes a rotor heat exchanger disposed within the rotor.

An exemplary embodiment of the starter/generator further includes a stator heat exchanger having an oil jacket around the housing for cooling the stator. An exemplary embodiment of the oil cooling system is a dry cavity oil cooling system which prevents cooling oil from entering an air gap between the rotor and the stator. An exemplary embodiment of the stator heat exchanger includes a grooved tube around the housing and axially extending axial passages connected to annular inlet and outlet manifolds in the grooved tube. The axially extending axial passages may be axially extending grooves extending into the grooved tube from an inside surface of the grooved tube.

An exemplary embodiment of the rotor heat exchanger includes annular inner and outer tubes disposed in the rotor shaft and the outer tube surrounding and connected to the inner tube.

The brushless starter/generator may be incorporated in an aircraft gas turbine engine integrated brushless starter/generator system in which the brushless starter/generator is mounted to an engine accessory gearbox. The rotor extends into the gearbox and is operably connected to a power take-off shaft within the gearbox or to a gear train operably connected to the power take-off shaft within the gearbox. The rotor shaft may be rotatably supported by a shaft bearing in the accessory gearbox. The rotor shaft may be rotatably supported by a shaft bearing in a gearbox casing of the accessory gearbox.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
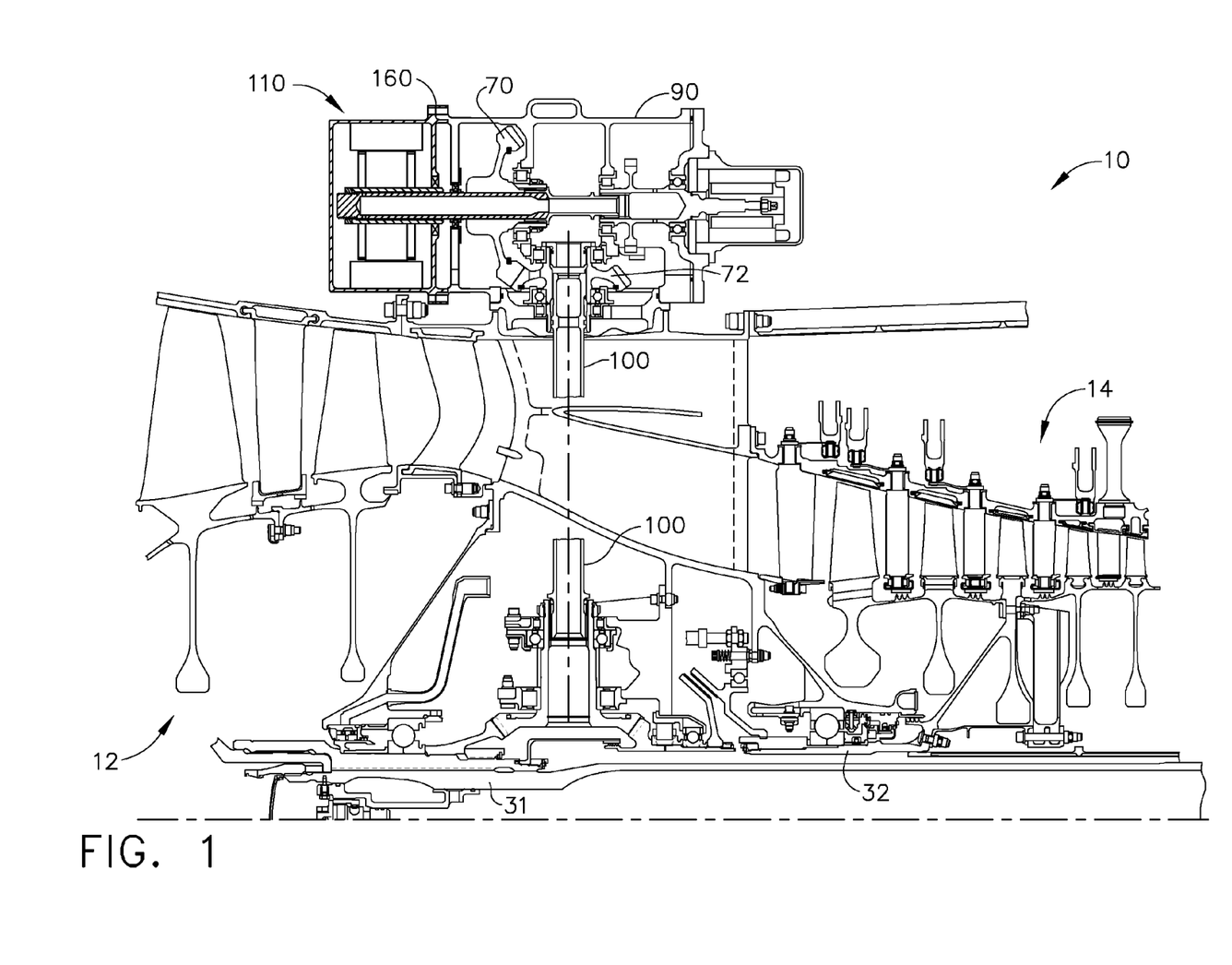
FIG. 1 is a cross-sectional view illustration of an exemplary embodiment of an aircraft gas turbine engine brushless starter/generator mounted on an aircraft gas turbine engine.

Illustrated in FIG. 1 is an exemplary embodiment of a gas turbine engine 10 having a longitudinal axis 11. The engine 10 includes a fan section 12 followed by a core engine as represented by a high pressure compressor 14. The high pressure compressor 14 is driven via a first shaft 32 by a high pressure turbine (not illustrated). The fan section 12 is driven via a second shaft 31 by a low-pressure turbine (not illustrated) downstream of the core engine.

A brushless starter/generator 110 (BSG) is mounted to an engine accessory gearbox 90 and includes a rotor shaft 80 which is operably connected to an exemplary power take-off shaft 100 or alternatively to a gear train 101 (illustrated schematically in FIG. 2) operably connected to the power take-off shaft 100 within the engine accessory gearbox 90. A drive shaft bevel gear 70 fixedly mounted on the rotor shaft 80 engages a power take-off shaft bevel gear 72 mounted to the power take-off shaft 100. When the brushless starter/generator 110 is operated in its starter mode, it rotates and drives the engine through the power take-off shaft 100 for starting purposes. When the brushless starter/generator 110 is operated in its generator mode, it is rotated, driven and powered through the power take-off shaft 100 by the engine for the purpose of generating electricity for the aircraft.

Figure 2:
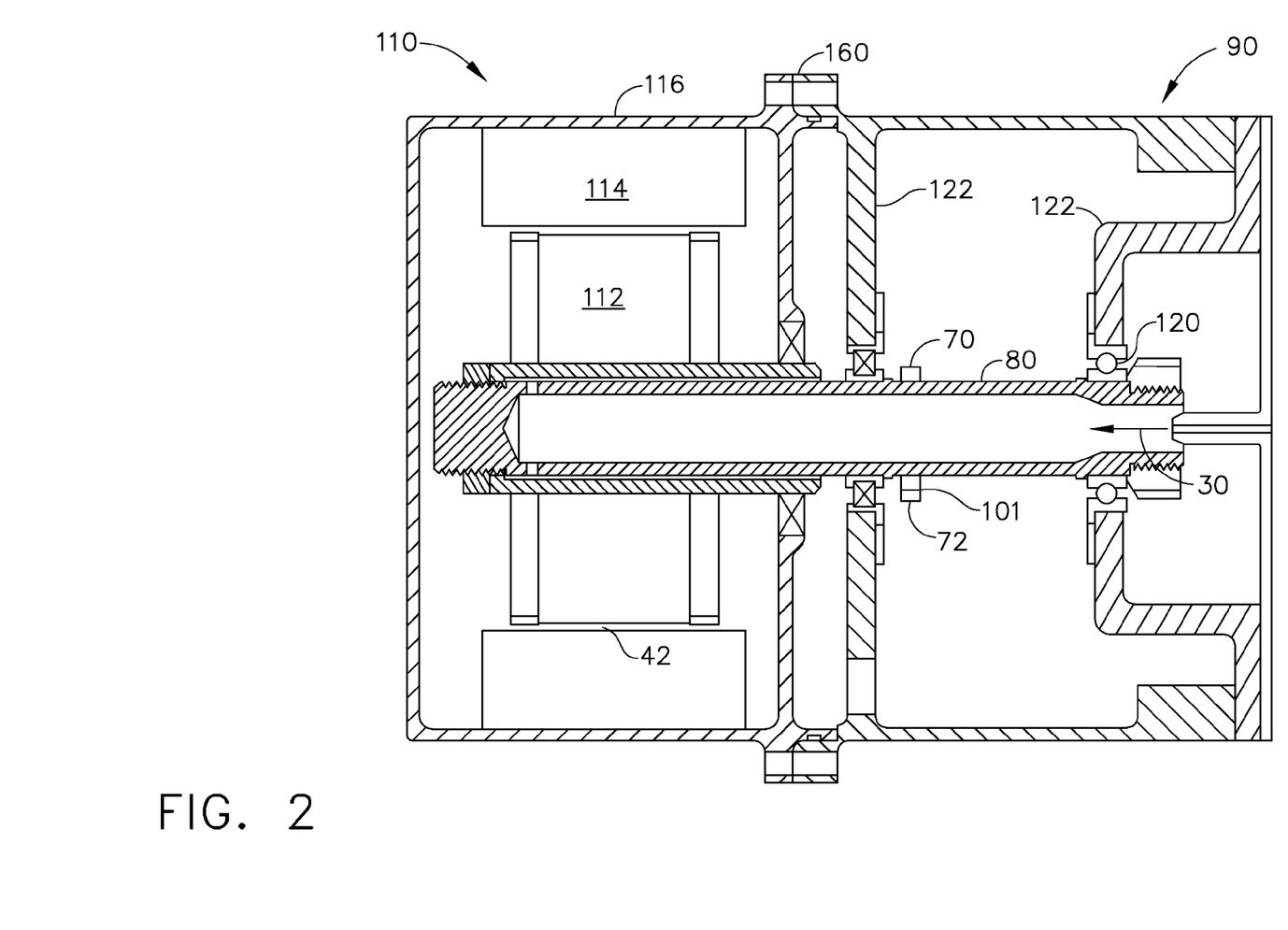
FIG. 2 is a schematical view illustration of the brushless starter/generator illustrated in FIG. 1.

As schematically illustrated in FIG. 2, the brushless starter/generator 110 is highly integrated with the accessory gearbox 90 in order to provide a low-weight and high-reliability system. The brushless starter/generator 110 includes an annular high-speed rotor 112 and an annular stationary stator 114 housed in a housing 116. The exemplary embodiment of the brushless starter/generator 110 illustrated herein includes the rotor 112 being mounted on the rotor shaft 80 in an overhung design wherein the rotor shaft 80 is rotatably supported by a shaft bearing 120 disposed in a gearbox casing 122 of the accessory gearbox 90. Thus, no bearings are required in the brushless starter/generator 110 though they may be incorporated. The exemplary embodiment of the BSG illustrated herein incorporates a squirrel cage type rotor 112 mounted on the rotor shaft 80.

Figure 3:
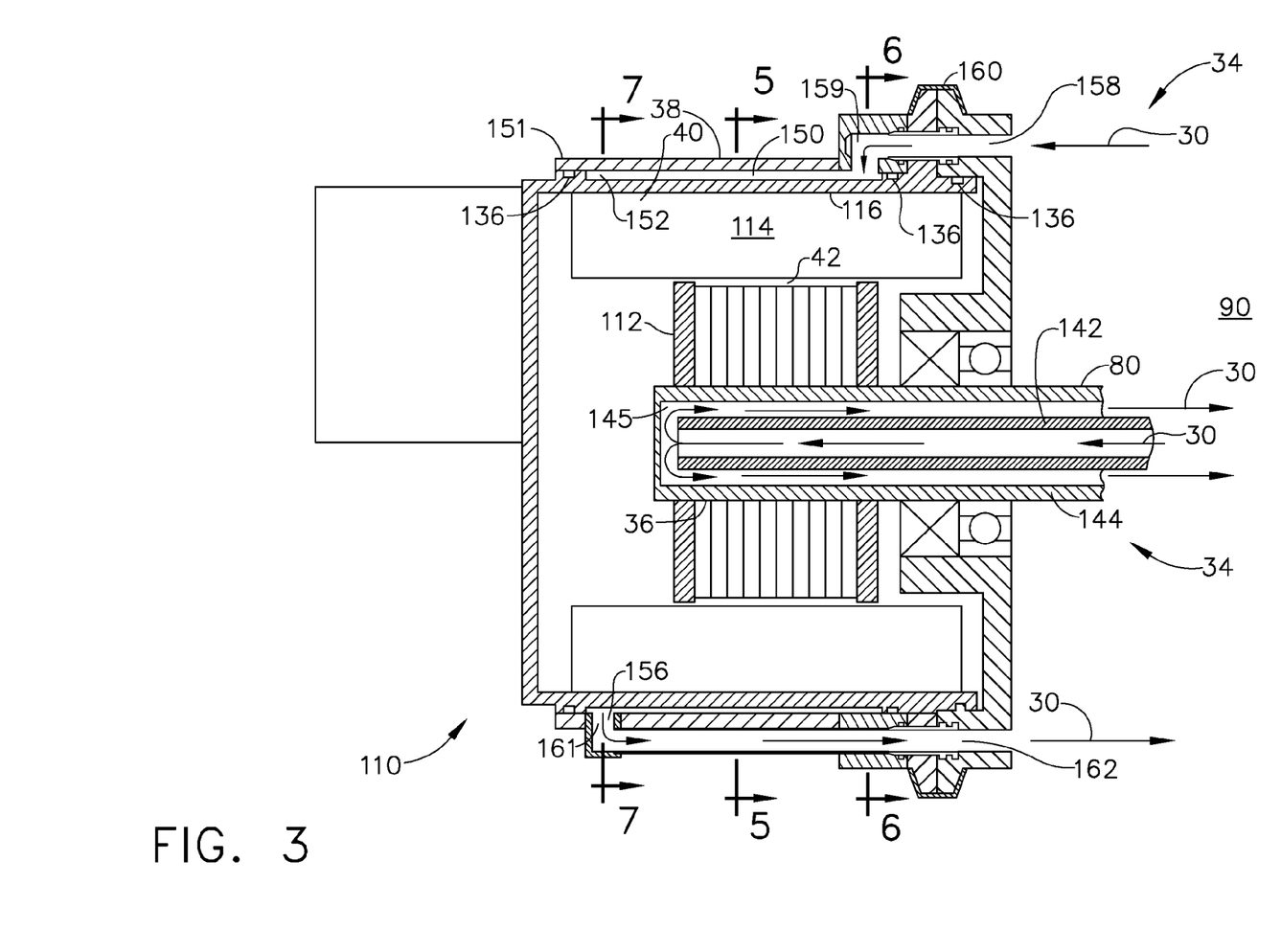
FIG. 3 is a schematical view illustration of an oil cooling system for the brushless starter/generator illustrated in FIG. 2.
Figure 4:
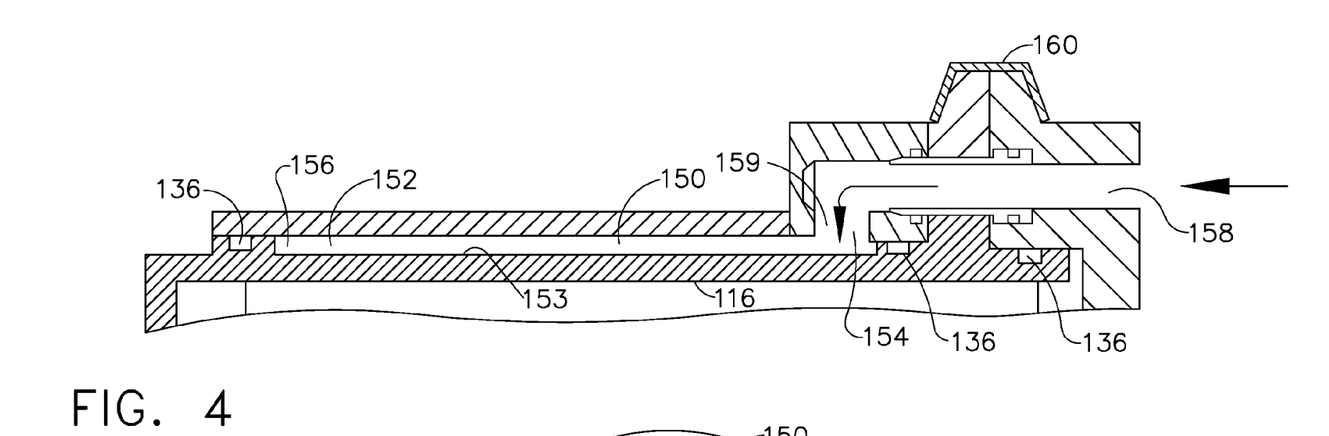
FIG. 4 is an enlarged illustration of axial and circumferential grooves of the oil cooling system illustrated in FIG. 3.
Figure 5:
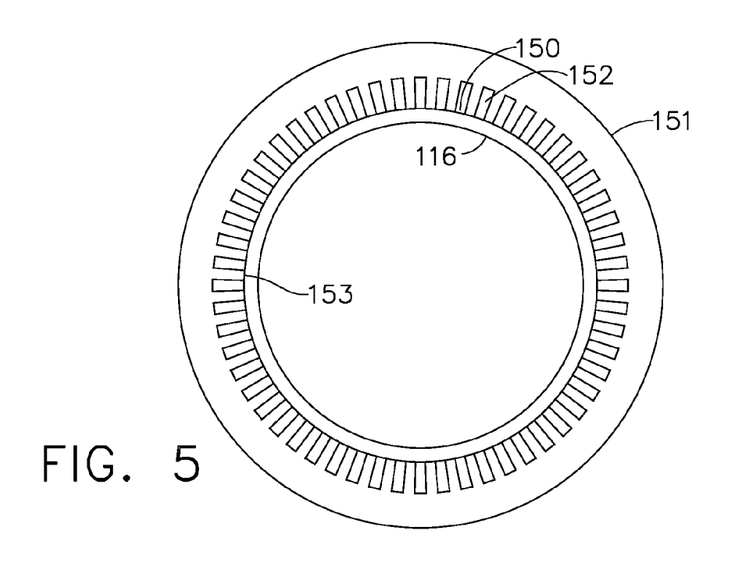
FIG. 5 is a cross-sectional illustration of the circumferential grooves of the oil cooling system illustrated in FIG. 3.
Figures 6, 7:
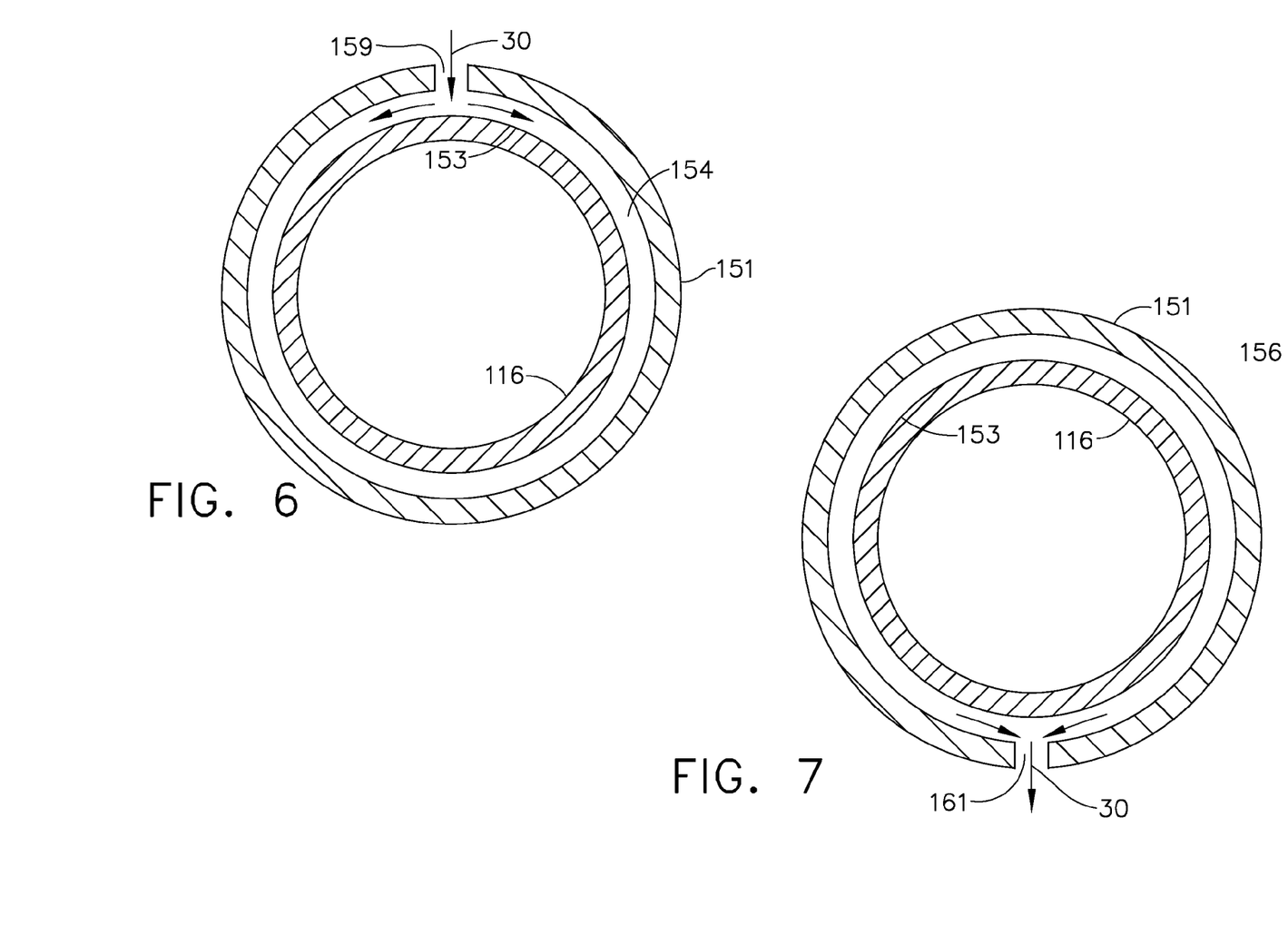
FIG. 6 is a cross-sectional illustration of an annular inlet manifold of the oil cooling system illustrated in FIG. 3.
FIG. 7 is a cross-sectional illustration of an annular outlet manifold of the oil cooling system illustrated in FIG. 3.

Referring to FIG. 3, the BSG has an oil cooling system 34 that uses oil 30 from the from the accessory gearbox 90 to cool the rotor 112 and the stator 114 thus allowing for further simplification and elimination of some maintenance. Using oil from the accessory gearbox 90 to cool the BSG also allows for the elimination of a starter/generator cooling fan and associated ducting/parasitic flows required for air cooled brushed starter/generators. The BSG oil cooling system 34 incorporates dry cavity cooling with which heat generated in the BSG is removed by the engine lube oil system by convection and by conduction to the engine gearbox. The dry cavity oil cooling system 34 design includes a rotor heat exchanger 36 and a stator heat exchanger 38 which do not permit cooling oil to contact insulation 40 used in the BSG.

No cooling oil is permitted in an air gap 42 between the rotor 112 and the stator 114. This dry cavity design improves reliability over typical wet cavity designs in which oil is permitted to contact nonmetallic materials, such as insulation. Insulation is not degraded because there is no direct impingement of hot oil on the windings. There is no eroded insulation material suspended in the oil, thus preventing oil contamination (especially important in a shared oil system). Oil is neither sprayed nor mixed with air, so there is no frothing, and an air/oil separator is not required. The absence of free oil contacting the rotor also reduces rotor windage losses.

The rotor 112 is cooled by convection using oil flowing through a central area of the BSG rotor shaft 80. The exemplary embodiment of the rotor heat exchanger 36 illustrated herein includes annular inner and outer tubes 142,144 disposed in the rotor shaft 80 and outer tube 144 surrounding the inner tube 142. The inner and outer tubes 142, 144 are connected together by a cylindrical crossover 145 which may be a cap on the outer tube 144. The inner and outer tubes 142, 144 serve as axial inflow and outflow passages for the rotor heat exchanger 36. Cooling oil supplied from the accessory gearbox 90 flows into the shaft inside the inner tube 142 disposed in the rotor shaft 80 and returns back to the accessory gearbox 90 gearbox though the annular outer tube 144 disposed around the inner tube 142.

The exemplary embodiment of the stator heat exchanger 38 illustrated in FIGS. 3-6 includes an oil jacket 150. The oil jacket 150 is formed using a grooved tube 151 around the housing 116 and includes axially extending axial passages 152 or grooves providing single pass parallel oil flow. The grooved tube 151 may be made of extruded aluminum. Annular inlet and outlet manifolds 154, 156 provide oil inlet and outlet distribution and are designed to supply uniform flow over the entire periphery of the oil jacket 150. The axially extending axial passages 152 may be axially extending grooves extending into the grooved tube 151 from an inside surface 153 of the grooved tube 151 as further illustrated in FIG. 5. The annular inlet and outlet manifolds 154, 156 may be annular grooves extending into the grooved tube 151 from the inside surface 153 respectively of the grooved tube 151 as further illustrated in FIGS. 6 and 7 respectively. O-ring seals 136 between the grooved tube 151 and the housing 116 are provided outboard of the manifold annular inlet and outlet manifolds 154, 156 to prevent oil leakage.

Oil is supplied through an oil inlet 159 to the inlet manifold 154 through an inlet oil fitting 158 mounted in a BSG flange 160. Oil then flows axially through the parallel axial passages 152 to the outlet manifold 156 and exits 180 degrees away from the oil inlet 159 through an oil outlet 161 from the outlet manifold 156. By providing the oil inlet 159 and oil outlet 161 180 degrees apart, all oil paths are essentially the same length, and the oil distributes evenly. The oil is returned to the accessory gearbox 90 by an outlet oil fitting 162 mounted in the BSG flange 160. The stator core is also cooled by the conduction to the engine gearbox housing.

Figure 8:
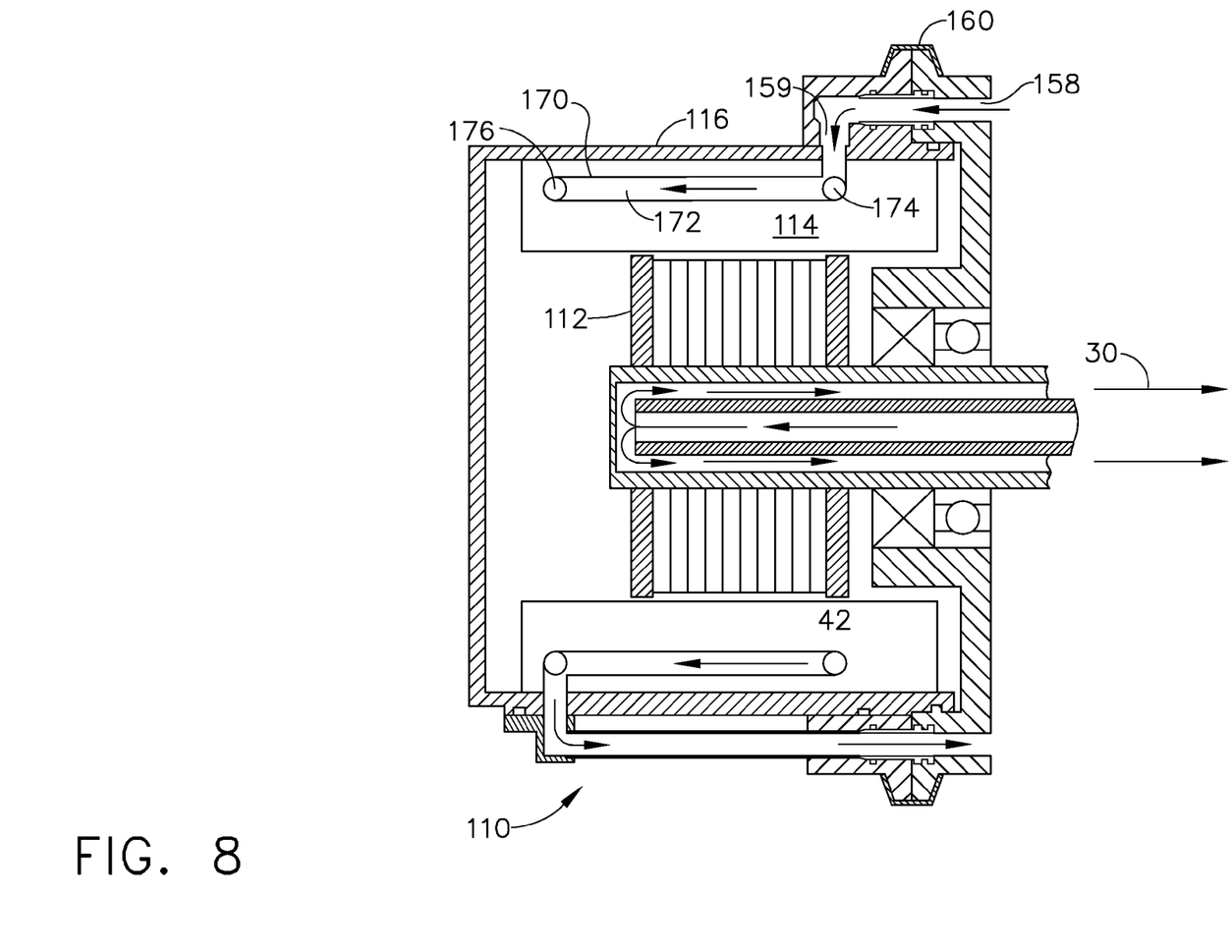
FIG. 8 is a schematical view illustration of an alternative oil cooling system for the brushless starter/generator illustrated in FIG. 2.

An alternative embodiment of the stator heat exchanger 38 illustrated in FIG. 8 includes a squirrel cage heat exchanger 170 with axially extending axial passages or axial tubes 172 providing single pass parallel oil flow. Annular inlet and outlet tube manifolds 174, 176 provide oil inlet and outlet distribution and are designed to supply uniform flow throughout the squirrel cage heat exchanger 170 and, in particular, through the axially extending axial tubes 172.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An aircraft gas turbine engine brushless starter/generator comprising:
   the aircraft gas turbine engine brushless starter/generator operable to provide both starting and electrical power generation for an aircraft gas turbine engine,
   a rotor rotatably mounted within a stator mounted within a housing of the aircraft gas turbine engine brushless starter/generator,
   an oil cooling system for using cooling oil from an aircraft gas turbine engine accessory gearbox for cooling the rotor and the stator,
   the rotor fixedly mounted on a rotor shaft, and
   the oil cooling system including a rotor heat exchanger disposed within the rotor.

2. The starter/generator as claimed in claim 1, further comprising the oil cooling system including a stator heat exchanger for cooling the stator and the stator heat exchanger including an oil jacket around the housing.

3. The starter/generator as claimed in claim 2, further comprising the stator heat exchanger including a grooved tube around the housing and axially extending axial passages connected to annular inlet and outlet manifolds in the grooved tube.

4. The starter/generator as claimed in claim 3, further comprising the axially extending axial passages being axially extending grooves extending into the grooved tube from an inside surface of the grooved tube.

5. A starter/generator as claimed in claim 1, further comprising the rotor heat exchanger including annular inner and outer tubes disposed in the rotor shaft and the outer tube surrounding and connected to the inner tube.

6. The starter/generator as claimed in claim 5, further comprising the oil cooling system including a stator heat exchanger for cooling the stator and the stator heat exchanger including an oil jacket around the housing.

7. The starter/generator as claimed in claim 6, further comprising the stator heat exchanger including a grooved tube around the housing and axially extending axial passages connected to annular inlet and outlet manifolds in the grooved tube.

8. The starter/generator as claimed in claim 7, further comprising the axially extending axial passages being axially extending grooves extending into the grooved tube from an inside surface of the grooved tube.

9. The starter/generator as claimed in claim 1, further comprising the oil cooling system being a dry cavity oil cooling system including means for preventing cooling oil from entering an air gap between the rotor and the stator.

10. An aircraft gas turbine engine integrated brushless starter/generator system comprising:
- an aircraft gas turbine brushless starter/generator operable to provide both starting and electrical power generation for an aircraft gas turbine engine,
- the engine brushless starter/generator including a rotor rotatably mounted within a stator mounted within a housing of the aircraft gas turbine engine brushless starter/generator,
- the brushless starter/generator mounted to an aircraft gas turbine engine accessory gearbox,
- the rotor fixedly mounted on a rotor shaft extending into the gearbox and operably connected to an aircraft gas turbine power take-off shaft within the gearbox or to a gear train operably connected to the power take-off shaft within the gearbox,
- an oil cooling system for using cooling oil from the engine accessory gearbox for cooling the rotor and the stator, and
- the oil cooling system including a rotor heat exchanger disposed within the rotor.

11. The system as claimed in claim 10, further comprising the rotor shaft being rotatably supported by a shaft bearing in the accessory gearbox.

12. The system as claimed in claim 10, further comprising the rotor shaft being rotatably supported by a shaft bearing in a gearbox casing of the accessory gearbox.

13. The system as claimed in claim 11, further comprising the oil cooling system including a stator heat exchanger for cooling the stator and the stator heat exchanger including an oil jacket around the housing.

14. The system as claimed in claim 13, further comprising the stator heat exchanger including a grooved tube around the housing and axially extending axial passages connected to annular inlet and outlet manifolds in the grooved tube.

15. The system as claimed in claim 14, further comprising the axially extending axial passages being axially extending grooves extending into the grooved tube from an inside surface of the grooved tube.

16. A system as claimed in claim 12, further comprising the rotor heat exchanger including annular inner and outer tubes disposed in the rotor shaft and the outer tube surrounding and connected to the inner tube.

17. The system as claimed in claim 16, further comprising the oil cooling system including a stator heat exchanger for cooling the stator and the stator heat exchanger including an oil jacket around the housing.

18. A system as claimed in claim 17, further comprising the stator heat exchanger including a grooved tube around the housing and axially extending axial passages connected to annular inlet and outlet manifolds in the grooved tube.

19. The system as claimed in claim 18, further comprising the axially extending axial passages being axially extending grooves extending into the grooved tube from an inside surface of the grooved tube.

20. The system as claimed in claim 12, further comprising the oil cooling system being a dry cavity oil cooling system including means for preventing cooling oil from entering an air gap between the rotor and the stator.

\* \* \* \* \*